United States Patent [19]

Ando et al.

[11] 4,405,455

[45] Sep. 20, 1983

[54] ADSORPTION SEPARATION APPARATUS

[75] Inventors: Masao Ando, Musashino; Tetsuya Hirota, Fujisawa; Katashi Shioda, Machida, all of Japan

[73] Assignee: Mitsubishi Chemical Industries Limited, Tokyo, Japan

[21] Appl. No.: 337,522

[22] Filed: Jan. 6, 1982

Related U.S. Application Data

[62] Division of Ser. No. 90,133, Nov. 1, 1979, Pat. No. 4,332,623.

[30] Foreign Application Priority Data

Nov. 2, 1978 [JP] Japan .................................. 53-135312
Dec. 28, 1978 [JP] Japan .................................. 53-163720
Mar. 13, 1979 [JP] Japan .................................... 54-29126

[51] Int. Cl.$^3$ ............................................. B01D 15/00
[52] U.S. Cl. ...................................... 210/191; 210/284
[58] Field of Search ............... 127/46.2; 210/677, 676, 210/190, 191, 195.1, 269, 283, 284

[56] References Cited

U.S. PATENT DOCUMENTS

| | | | |
|---|---|---|---|
| 2,985,589 | 5/1961 | Broughton et al. | 210/676 |
| 4,157,267 | 6/1979 | Odawara et al. | 127/46.2 |
| 4,182,633 | 1/1980 | Ishikawa et al. | 127/46.2 |

Primary Examiner—Ivars C. Cintins

Attorney, Agent, or Firm—Oblon, Fisher, Spivak, McClelland & Maier

[57] ABSTRACT

A method for separating a starting fluid containing at least one component which is easy to adsorb and at least one component which is hard to adsorb into the respective components by the use of an adsorption separator which comprises a packed bed where an adsorbent for such components is packed and a fluid passage connecting the front and rear ends of said packed bed so that the fluid is able to be circulated, the method comprising the first step of feeding the starting fluid to an intermediate portion of the packed bed while withdrawing from the separator a fluid rich with either of the components in an amount equal to the feed of the starting fluid from a position downstream of the feed port, the second step of stopping the feed of the fluid to and the withdrawal of the fluid from the separator and moving the fluid remaining in the separator toward the downward direction, and the third step of feeding a desorbent fluid to the separator and simultaneously withdrawing from the separator a fluid rich with either of the components in an amount equal to the feed of the desorbent fluid from a position downstream of the desorbent feed port, the respective withdrawals of fluid from the separator being conducted at least two different positions, the adsorption bands being left in part of the packed bed in the third step. Apparatus for carrying out the method is disclosed.

8 Claims, 5 Drawing Figures

ADSORPTION SEPARATION APPARATUS

This is a division of application Ser. No. 90,133, filed Nov. 1, 1979, now U.S. Pat. No. 4,332,623.

BACKGROUND OF THE INVENTION

1. Field of the Invention

This invention relates to an apparatus for separating a mixture by adsorption. The term "adsorption" used herein is intended to mean a phenomenon of retaining the components in a fluid a solid no matter how the retaining mechanism may be such as an adsorption, absorption, sorption, combination, ion exchange or the like. More particularly, the present invention relates to an apparatus for separating, by column chromatography, a solution containing two or more components into at least two fractions, i.e., a fraction which is rich with a component susceptible to adsorption by an adsorbent and a fraction enriched with a component which is hard to be adsorbed by the same adsorbent.

2. Description of the Prior Art

The separation of mixtures by adsorption using various types of adsorbents has been known and widely applied industrially. The simplest adsorption separator is a single column packed with adsorbents. In order to conduct the separation using a column, there is first fed from the top of the column a starting solution which contains both a component which is susceptible to adsorption by adsorbents and a component which is difficult to adsorb, followed by feeding a desorbent. Typical of the procedure using such column, there is first discharged from the bottom a solution enriched with the hard-to-adsorb component, then a solution which is rich with both the hard-to-adsorb component and the easy-to-adsorb component, and finally a solution which is rich with the easy-to-adsorb component. The solution containing both components which is discharged at the intermediate stage of the procedure is recycled to the top of the column after being mixed with the starting solution. This separation procedure is capable of being conducted by use of simple apparatus and is simple in operation but it is not good at the efficiency of separation. In addition, the procedure generally requires large quantities of desorbent, so that the concentration of the hard-to-adsorb component or the easy-to-adsorb component in a solution obtained as a product becomes diluted. In U.S. Pat. No. 3,416,961, there is described an improved method in which the solution discharged from the bottom of a column is divided into a number of fractions. The fractions other than those useful as products are temporarily stored in tanks for a subsequent feed from the tanks to the column in the intervals of feeding the starting solution and the desorbent to the column.

In U.S. Pat. No. 4,022,637, there is described a method wherein a solution discharged from the bottom of a column is divided into five fractions, of which two fractions are used as a product and the remaining three are recycled to the column. Two fractions of the three are directly recycled to the top of the column and the other one is stored in a tank and fed to the top of the column subsequent to the starting solution.

In these methods described hereinabove, all the solutions in the column flow down from the bottom of the column. Further, an additional tank or tanks are required for the fraction or fractions other than the product, which have to be stored temporarily therein.

Japanese Laid-open Patent Application No. 53-149870, describes a method in which fractions other than a product are directly recycled to the top of a column without use of any storage tank. In this method, however, the fractions as product are withdrawn only from the bottom of the column. A modification is also described in which the two columns are combined and fractions useful as product are withdrawn from the bottom of the respective columns. In either method, two fractions are recycled every cycle of the operation.

SUMMARY OF THE INVENTION

According to the present invention, there is provided a method for efficiently separating, into the respective components, two types of components in a starting fluid, i.e., at least one component which is susceptible or easy to adsorb with an adsorbent and at least one component which is hard to adsorb, the method comprising, in this order, the first step of feeding the starting fluid to an intermediate portion of a packed bed of an adsorption separator, in which the adsorbent-packed bed is connected with fluid passages at the front and rear ends thereof to allow the fluid to be recycled, while withdrawing, a fluid which is rich with either of the components from downstream of the feed port, the second step of stopping the feed of the fluid to and the withdrawal of the fluid from the separator and moving the fluid in the separator in the downward direction, and the third step of feeding a desorbent fluid to the separator simultaneously with the withdrawal of a fluid rich with either of the components from downstream of the desorbent-feed port, the withdrawal of the fluid from the separator being conducted from at least two positions, an adsorption band being left in part of the packed bed in the third step.

There is also provided, in accordance with the invention, an adsorption separator for suitably carrying out the above method, the separator comprising three packed sections in which an adsorbent is packed and which are connected in series, the front end of the first packed section being communicated with the rear end of the third packed section through a fluid passage so that a fluid is capable of being circulated through the respective packed sections, at least one pump mounted in the circulating system, an inlet port for a starting fluid which is located between the rear end of the second packed section and the front end of the third section, a port for introducing a desorbent fluid into the separator said port being provided intermediate the rear end of the third packed section and the front end of the first packed section, and two ports for withdrawing fluids from the separator, one provided between the rear end of the first packed section and the front end of the second packed section and the other at an intermediate between the front end of the third packed section and the front end of the first packed section, the latter of which is located upstream of the desorbent fluid introduction port in case the latter withdrawal part is provided between the rear end of the third packed section and the fron end of the first packed section, wherein a means for inhibiting the backward flow of the desorbent fluid is provided in the fluid passage between the withdrawal port and the introduction port.

BRIEF DESCRIPTION OF THE DRAWINGS

In FIGS. 1-3; 1-4: unit packed bed, 5,6: pump, 7-11: reservoir, 12-24: valve.

DETAILED DESCRIPTION OF THE PREFERRED EMBODIMENTS

Figure 1:
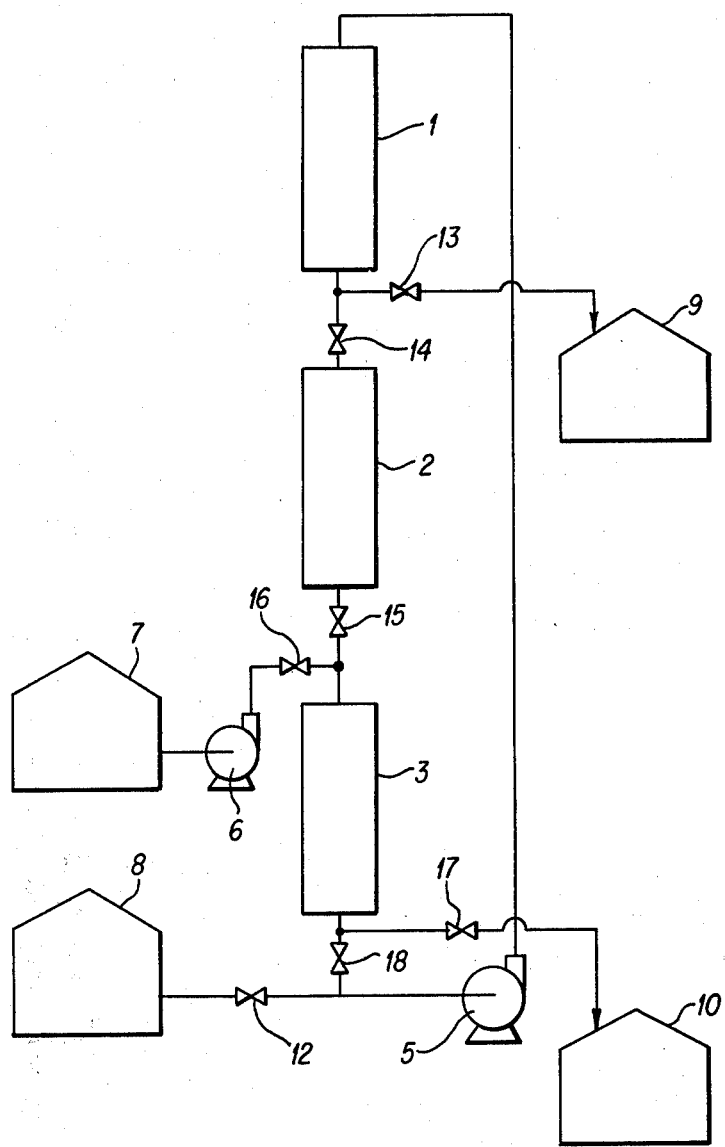
FIG. 1 is a schematical view showing a fundamental arrangement of an adsorption separator according to the invention.

The present invention will be described in more detail.

In the practice of the invention, the separation of substances is conducted by the use of an apparatus provided with a packed bed in which an adsorbent is packed. The packed bed is connected through a fluid passage at its front and rear ends and is provided with at least two fluid feed ports in a stream direction and also with at least two fluid withdrawal ports, respectively. The packed bed is divided into three sections by means of these fluid feed and withdrawal ports. In other words, the packed bed is divided into three sections in its lengthwise direction and the fluid feed ports and/or the fluid withdrawal ports are provided between the respective sections.

Each section may be further divided into sub-sections. If the sub-sections are provided, it is general to provide fluid feed ports and/or fluid withdrawal ports between them.

In between any two of the sections or sub-sections is provided at least one circulating pump to circulate the fluid through the separator. Within the packed bed, the fluid is moved in one direction, that is, only in a downward direction.

In the adsorption-separation method according to the invention, the first step is to feed the starting fluid from one of the fluid feed ports into one section of the apparatus. The fed starting fluid is moved downwards through the bed, upon which the respective components contained in the starting fluid are adsorbed on an adsorbent depending on their degrees of affinity for the adsorbent, with the result that a dense adsorption band is formed in the downward direction from the feed port. The fluid which is present in the bed at the downstream side of the feed port is moved in a more downward direction by the action of fresh starting fluid. By the movement, the adsorption band of at least one component of the starting fluid which is present downward of the feed port is desorbed and the desorbed component-containing fluid is withdrawn from a fluid withdrawal port provided between the section and the next section. The amount of the withdrawn solution is made equal to the feed of the starting fluid. When the feed of the starting fluid reaches a predetermined amount, the feed of the starting fluid is stopped. The amount of the starting fluid in one operation cycle is usually less than that left in the section to which the starting fluid is fed.

In the second step, the feed of the fluid to the bed and the withdrawal from the bed are stopped, after which the circulation pump is worked to move the fluid in the bed toward the downward direction. The movement involves an adsorption-desorption phenomenon which takes place between the adsorbent and the respective components in the starting fluid. Accordingly, a component or components which are hard to adsorb move at greater speed whereas a component or components which are easy to adsorb move at a lesser speed, so that the adsorption bands of the hard-to-adsorb components and the easy-to-adsorb components are gradually but distinctly separated from each other. The degree of the separation is dependent on the difference in adsorptivity of the respective components against the adsorbent used and the distance of movement. In the practice of the invention, the fluid is passed through the circulating system and if the working time of the circulating pump is too long, the tip of the adsorption band of the hard-to-adsorb components which move at greater speed gains on the rear end of the adsorption band of the easy-to-adsorb components which move at smaller speed so that both adsorption bands again overlap each other. Accordingly, when both adsorption bands separate from each other, the circulation pump is stopped.

In the third step, a desorbent fluid is fed into the separator. The desorbent fluid flows downwards to permit the adsorbed components to be desorbed while the fluid left in the bed is forced downwards. Accordingly, simultaneously with the feed of the desorbent fluid, the fluid in the bed is withdrawn from a withdrawal port provided at an appropriate position downward of the feed port. The positions of feeding the desorbent fluid and withdrawing the fluid are so selected that the withdrawn fluid is rich with desired components. For instance, there is acceptable, a method in which a section or a sub-section where a certain component alone is adsorbed is selected, to which the desorbent fluid is fed from the upstream of the section, while withdrawing the fluid in the bed from the downstream of the section According to this method, it is, of course, possible to collect a fluid rich with such component. Alternatively, another method may be used in which a plurality of adsorption bands of components are contained in a zone between the feed port of the desorbent fluid and the withdrawal port of the fluid from the bed, and an adsorption band which is closest to the withdrawal port is desorbed while moving the adsorption bands of the respective components forward by the feed of the desorbent fluid. In this case, when the desorption is continued, the composition of the withdrawn fluid varies with a lapse of time, so that a withdrawn fluid can be separately collected according to the composition.

In this third step, the desorption is conducted such that part of the adsorption bands remain in the bed. This is because the adsorption bands of the respective components formed in the bed in the second stage are ordinarily partially superposed. If these superposed portions are removed by desorption, the composition of the obtained product is deteriorated. Another reason is that the adsorption band present in the section where the starting fluid is fed is desorbed in the first step, requiring no desorption in the third step.

Among the adsorption bands left after the operation of the third step, a portion which is not desorbed during the first step of a subsequent cycle forms one adsorption band together with an adsorption band of the starting fluid which is fed in the first step.

The method of the present invention is fundamentally comprised of the first to third steps but may be modified in various forms. For example, it is possible to provide an auxiliary step where when the starting fluid is stopped in feeding, a desorbent fluid is fed from the feed port for the starting fluid or from a position upstream of the feed port, and simultaneously the fluid which is discharging downwards through the bed is withdrawn from a position downstream of the feed port. This auxiliary step is effective, when the starting fluid contains a component which is much harder to adsorb than other components, in withdrawing such component from the bed prior to its movement through the bed in the second step.

The present invention will be described in more detail with reference to the accompanying drawings.

FIG. 1 shows a fundamental arrangement of an adsorption separator for suitably carrying out the method of the invention. The separator is arranged to include a circulating system which has three unit packed beds (1)–(3) and a circulation pump (5). Each unit packed bed is packed with an adsorbent. The unit packed beds may be the same or different size. Between the unit packed beds are provided valves (14), (15) and (18), respectively, to arbitrarily control the passage of the fluid through the respective unit packed beds. As shown, there are also provided between the respective unit packed beds an introduction pipe for the starting fluid having a valve (16), an introduction pipe for a desorbent fluid having a valve (12), a fluid withdrawal pipe having a valve (13) and a fluid withdrawal pipe having a valve (17). Indicated at (7) is a starting fluid tank, at (8) is a tank for the desorbent fluid, (9) and (10) are tanks for the withdrawn fluids, and at (6) is a pump for feeding the starting fluid. The valve (14) is to inhibit the fluid from being discharged into the unit packed bed (2) when the fluid from the unit packed bed (1) is withdrawn from the withdrawal pipe having the valve (13). Similarly, the valve (15) is to prevent the passage of the fluid between the unit packed beds (2) and (3) on introduction of the starting fluid into the unit packed bed (3). The valve (18) is provided to prevent the fluid from passing into the unit packed bed (1) when the fluid is withdrawn from the unit packed bed (3) through the withdrawal pipe having the valve (17) and also prevents the passage of the fluid between the unit packed beds (3) and (1) on introduction of the desorbent fluid into the unit packed bed (1). Some of these valves may be omitted depending on the manner of arranging the pipes connecting these unit packed beds and the manner of connecting the fluid introduction pipes and the fluid withdrawal pipes to the bed-connecting pipes. It is preferred to provide at the upper portion of each bed a means for dispersing the fluid to be introduced into the bed uniformly over the cross section of the bed.

Figure 2:
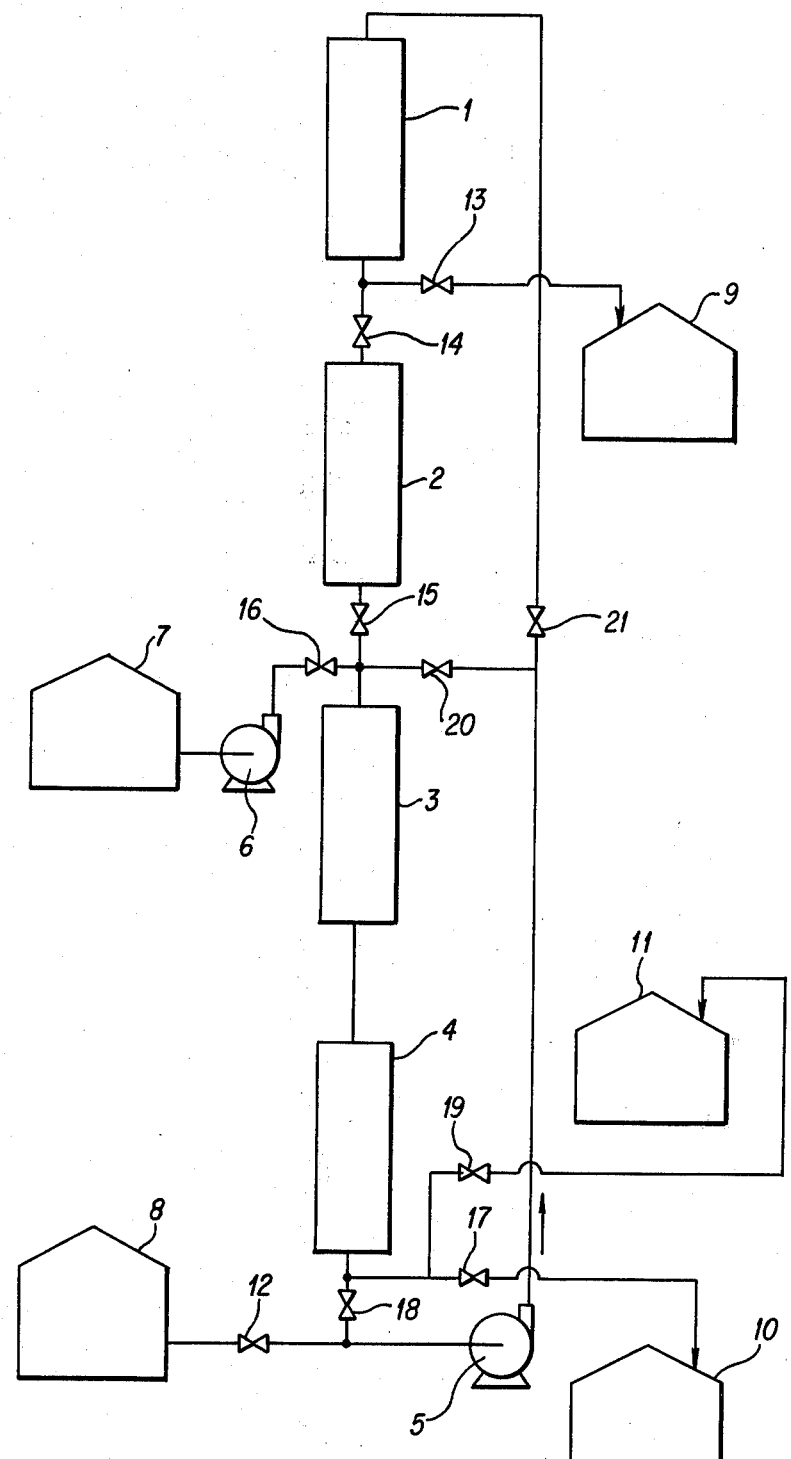
FIGS. 2 and 3 are schematical views showing modifications of the apparatus of FIG. 1.

FIG. 2, is another embodiment of the adsorption separator useful for the method of the invention. In this embodiment, the unit packed bed (3) of the separator of FIG. 1 is divided into two unit packed beds (3) and (4). Two withdrawal pipes are provided for the unit packed bed (4) including the withdrawal pipe having the valve (17) and a withdrawal pipe having a valve (19) which communicates with a reservoir (11) for the fluid withdrawn from this withdrawal pipe. In the apparatus of FIG. 2, a pipe connecting the unit packed beds (4) and (1) is provided with a valve (21) and is connected with a pipe provided between the unit packed beds (2) and (3) through a pipe having a valve (20). Accordingly, the separator of FIG. 2 allows the fluid passed from the unit packed bed (4) to be withdrawn in two different ways and the desorbent fluid to be directly charged into the unit packed bed (3).

Figure 3:
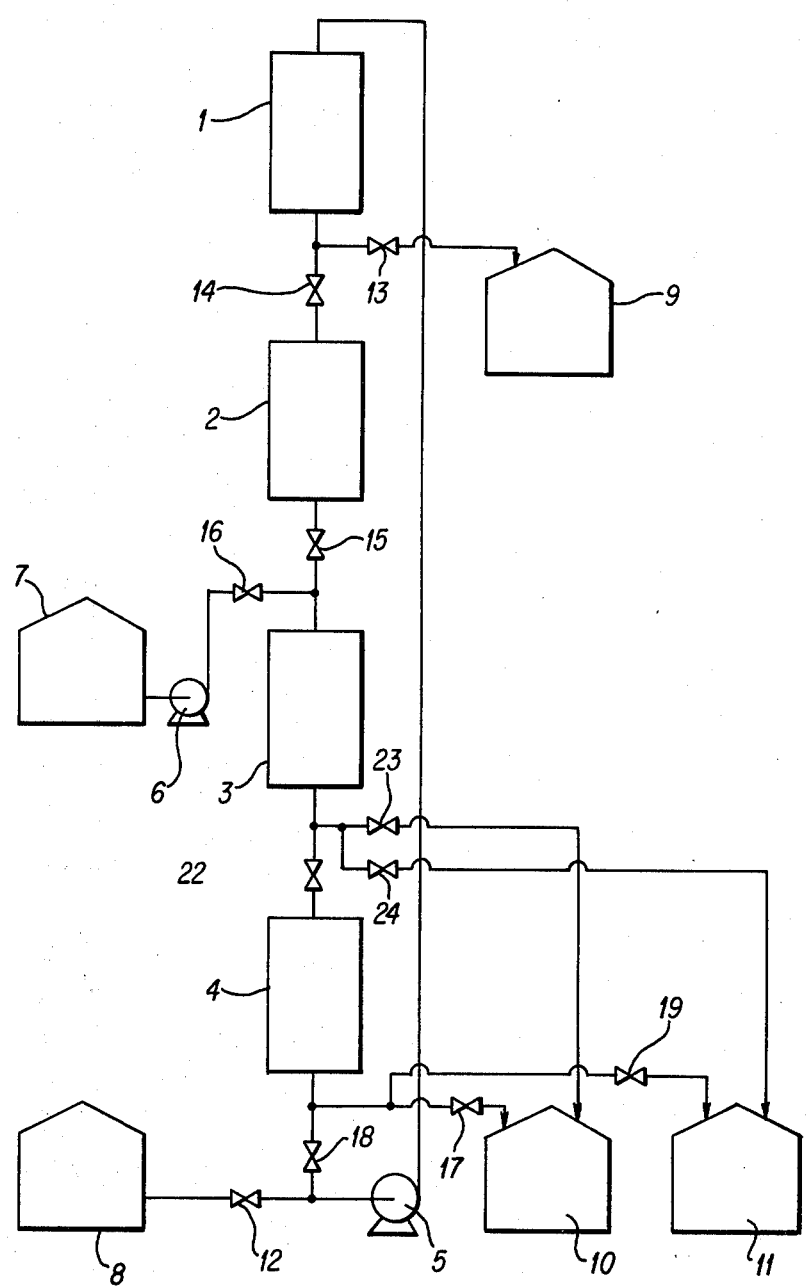

FIG. 3 is a further embodiment of an adsorption separator for carrying out the method of the invention. In this embodiment, the unit packed bed (3) of the separator of FIG. 1 is divided into unit packed beds (3) and (4), between which a valve (22) and two fluid withdrawal pipes are provided, i.e., a pipe having a valve (23) and a pipe having a valve (24). Further, similarly to the case of FIG. 2, the fluid from the unit packed bed (4) can be withdrawn through, aside from the withdrawal pipe having the valve (17), the pipe having the valve (19).

In an operation of carrying out the method of the invention by the use of the apparatus of FIG. 1, for example, the first step is carried out as follows. The valve (16) is opened to feed the starting fluid from the starting fluid reservoir for passing through the unit packed bed (3) and simultaneously the valve (17) is opened to withdraw the fluid from the withdrawal pipe in an amount corresponding to the feed. This withdrawn fluid is rich with a component which is hard to adsorb. Then, in the second step, the feed and withdrawal of the fluid are stopped and the valves (14), (15) and (18) are opened, followed by working the circulating pump (5) to permit the fluid in the apparatus to move from the bed (1) through the bed (2) toward the bed (3). By the movement, the respective components in the starting fluid are separated from one another to form the respective adsorption bands in predetermined positions of the bed.

Figure 4A:
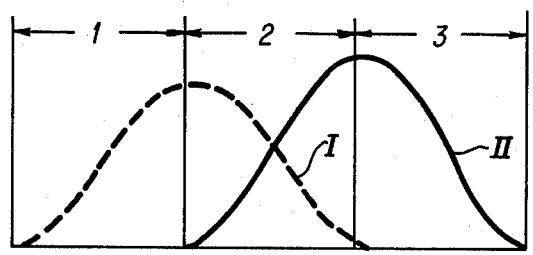
FIGS. 4A-D are schematical views showing the adsorption bands in the packed beds upon completion of the respective steps when carrying out the method of the invention using the apparatus of FIG. 1 (provided that the step of introducing the desorbent involves a change in operation of the valve during the course of this step and the operations prior to and after the change from one state to another are dealt with as two different steps), in which indicated at 1-3 are the respective unit packed beds and as I is an adsorption curve for a component ready for adsorption and at II is an adsorption curve for a component hard to adsorb and in which the arrows show positions where fluids are fed or withdrawn.

An example of the adsorption bands is shown in FIG. 4A.

Figure 4B:
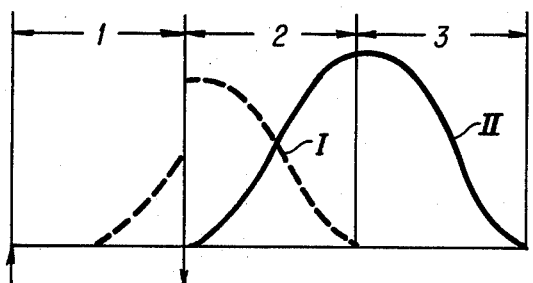

In the final third step, the valve (12) is opened to feed the desorbent fluid from the desorbent reservoir for passing through the unit packed bed (1) and simultaneously the valve (13) is opened to withdraw the fluid from the withdrawal pipe in an amount corresponding to the feed. As will be clear from FIG. 4B, the thus widthdrawn liquor is rich with a ready-to-adsorb component. Then, the valve (13) is closed and the valves (14), (15) and (17) are opened, after which when the desorbent fluid is fed, the fluid withdrawn from the unit packed bed (3) is rich with a component which is hard to adsorb.

Figure 4C:
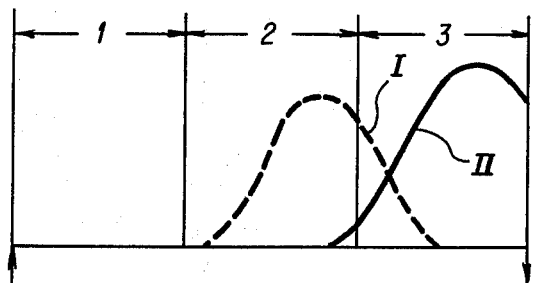

An example of the adsorption bands in the separator after completion of the third step is shown in FIG. 4C. In the latter part of the unit packed bed (2) and in the bed (3), the adsorption bands of the easy-to-adsorb component and the hard-to-adsorb component are left. By conducting the first to third steps, one cycle of the operation is complete.

Figure 4D:
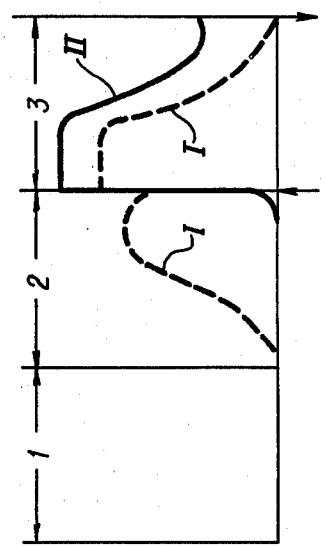

When the starting fluid is fed from the reservoir in the first step of a subsequent cycle, the hard-to-absorb component present in the latter part of the bed (3) is desorbed and discharged from the withdrawal pipe. As a result, the adsorption bands in the apparatus after completion of the first step are as shown in FIG. 4D.

It will be noted that the third step may be modified in various ways depending on the form of adsorption bands in the second step. Especially with the apparatus of FIGS. 2 and 3, such modification is easy. However, the adsorption bands in the bed should not be completely washed out in either modification for reasons described hereinbefore.

The present invention may be applied to separation of various types of mixtures. According to the invention, a mixture of two components i.e., a substance showing strong affinity for adsorbent and a substance showing weak affinity for adsorbent, can be readily separated into two components. The present invention is also applicable to a multi-component mixture, i.e., the just mentioned two-component mixture in which is incorporated a third component which shows an affinity for the adsorbent different from the first two components. In this case, the third component may be withdrawn from the apparatus in the form of a mixture with either or both of the two components, or may be withdrawn from the bed as a fluid rich with the third component.

The present invention is suitable for separating an aqueous solution containing fructose and glucose (as in HFCS (high fructose corn syrups), invert sugar and the like), into fructose and glucose with use of water as a desorbent. In such a case, there are used as the adsorbent, alkaline earth metal salt-type, particularly, calcium salt-type, strongly acidic cationic exchange resins. Alternatively, zeolite Y whose exchanging cations are substituted with those of ammonium, sodium, potassium, calcium, strontium, barium or the like.

Further, the present invention is preferably applicable to the separation of molasses into sucrose and reducing sugar using alkali metal salt-type strongly acidic cationic exchange resins as the adsorbent and water as the desorbent. In that case, the ashes present in molasses may be withdrawn from the apparatus while incorporating them into both the sucrose and reducing sugar, or may be withdrawn as an aqueous solution rich with the ashes separately from an aqueous solution rich with sucrose or reducing sugar. The molasses should preferably be refined, prior to the separation, to reduce the calcium content.

Still further, the present invention is preferable to separate a mixture of glucose and mannose into the respective components using calcium salt-type acidic cationic exchange resins as the adsorbent and water as the desorbent.

The present invention will be particularly illustrated by way of the following examples, which should not be construed as limiting the invention.

EXAMPLE 1

The apparatus of FIG. 2 was used to separate an aqueous molasses solution (solid content 60% with its composition of 41.3% of sucrose, 38.0% of reducing sugar, 9.2% of ash and 11.5% of organic nonsaccharides) into an aqueous sucrose solution, an aqueous reducing sugar solution and an aqueous ash solution. There was used as adsorbent a sodium slat-type strongly acidic cationic exchange resin (Diaion FRK-11, Daiaion is a registered trade mark of Mitsubishi Chemical Industries Limited) and as a desorbent water, respectively.

In FIG. 2, each unit packed bed is a cylinder having an inner diameter of 5.35 cm and a height of 380 cm in which 8.5 l of the adsorbent is packed. The unit packed beds are communicated with one another through pipes with an inner diameter of 3 mm and a volume (non-packed capacity), between the lower end of the packed layer of unit packed bed and the upper end of the packed layer of a subsequent packed bed, of 450 ml. The apparatus is held at 60° C.

The operations of the respective stages are as follows:

First Stage: Molasses is fed from the reservoir (7) for aqueous molasses solution to the unit packed bed (3) and simultaneously an aqueous sucrose solution is withdrawn from the unit packed bed (4) into the reservoir (11) for the aqueous sucrose solution.

Second Stage: Water is fed from the water reservoir (8) to the unit packed bed (1), simultaneously with an aqueous ash solution being withdrawn from the unit packed bed (4) into the reservoir (10) for the aqueous ash solution.

Third Stage: The feed of the solution to the apparatus and the withdrawal of the solution from the apparatus are stopped and the solution in the apparatus is moved from the unit packed bed (1) through (2) and (3) to the bed (4).

Fourth Stage: Water is fed from the water reservoir (8) to the unit packed bed (1), simultaneously with the aqueous reducing sugar solution being withdrawn from the bed (1) into the reservoir (9) for the aqueous reducing sugar solution.

Fifth Stage: Water is fed from the water reservoir (8) to the unit packed bed (3) while the aqueous ash solution is withdrawn from the unit packed bed (4) into the reservoir (10) for the aqueous ash solution.

Sixth Stage: Water is fed from the water reservoir (8) to the unit packed bed while an aqueous sucrose solution is withdrawn from the unit packed bed (4) into the reservoir (11).

The operation times and the operations of the valves at the respective stages are as indicated in Table 1.

The flow rate, by volume, of the solution at the respective stages was held constant at 12.1 l/hr. The compositions of the solutions in the respective product reservoirs under stationary conditions were as shown in Table 2.

TABLE 1

| | stage | | | | | |
|---|---|---|---|---|---|---|
| | 1 | 2 | 3 | 4 | 5 | 6 |
| | time | | | | | |
| valve | 21.8 (min) | 30.3 (min) | 75.5 (min) | 11.8 (min) | 15.0 (min) | 18.6 (min) |
| 12 | x | o | x | o | o | o |
| 13 | x | x | x | o | x | x |
| 14 | x | o | o | x | x | x |
| 15 | x | o | o | x | x | x |
| 16 | o | x | x | x | x | x |
| 17 | x | o | x | x | o | x |
| 18 | x | x | o | x | x | x |
| 19 | o | x | x | x | x | o |
| 20 | x | x | x | x | o | o |
| 21 | x | o | o | o | x | x | o: opened
x: closed

TABLE 2

| | aqueous sucrose solution | aqueous reducing sugar solution | aqueous ash solution |
|---|---|---|---|
| composition of solid | | | |
| sucrose (%) | 86.2 | 0.5 | 15.2 |
| reducing sugar (%) | 1.4 | 96.5 | 27.9 |
| ash (%) | 1.5 | 3.0 | 30.1 |

TABLE 2-continued

|  | aqueous sucrose solution | aqueous reducing sugar solution | aqueous ash solution |
|---|---|---|---|
| organic non-saccharides (%) | 10.9 | 0 | 26.8 |
| concentration of solid (%) | 16.9 | 38.7 | 9.0 |

EXAMPLES 2-4

The apparatus shown in FIG. 3 was used to separate HFCS into an aqueous fructose solution and an aqueous glucose solution. There were used as the adsorbent a calcium salt-type strongly acidic cationic exchange resin (Diaion FRK-01) and as the desorbent water, respectively.

In FIG. 3, each unit packed bed in a cylinder having an inner diameter of 7.7 cm and a height of 60 cm, in which 2.8 l of the adsorbent is packed. The apparatus is held at 60° C.

The operations at the respective stages are as follows:

First Stage: HFCS is fed from the reservoir (7) to the unit packed bed (3) simultaneously with an aqueous glucose solution being withdrawn from the unit packed bed (3) or (4) into the reservoir (10) for the aqueous glucose solution.

Second Stage: The feed and withdrawal of solutions are stopped and the solution in the apparatus is moved from the unit packed bed (1) through (2) and (3) toward the unit packed bed (4).

Third Stage: Water is fed from the water reservoir (8) to the unit packed bed (1) while withdrawing an aqueous fructose solution from the same bed into the reservoir (9) for the aqueous fructose solution.

Fourth Stage: Water is fed from the water reservoir (8) to the unit packed bed (1) while withdrawing the aqueous glucose solution from the bed (3) or (4) into the reservoir (11) for the aqueous glucose solution.

The operation times and operations of the valves at the respective stages are shown in Table 3 and the composition of the starting HFCS and the compositions of the solutions in the product reservoirs held under stationary conditions are shown in Table 4. The flow rate at the respective stages was held constant at 4.0 l/hr.

TABLE 4

Compositions of Starting Material and Products

|  |  | starting HFCS | solution discharged at first stage | solution discharged at third stage | solution discharged at fourth stage |
|---|---|---|---|---|---|
| Example 2 | fructose (%) | 42.3 | 0.66 | 83.9 | 3.4 |
|  | glucose (%) | 52.3 | 93.2 | 14.3 | 83.6 |
|  | other saccharides (%) | 5.4 | 6.1 | 1.8 | 13.0 |
|  | total sugar conc. (%) | 59.9 | 26.4 | 25.7 | 13.7 |
| Example 3 | frutose (%) | 42.3 | 1.4 | 80.4 | 11.6 |
|  | glucose (%) | 52.3 | 94.5 | 17.4 | 67.0 |
|  | other saccharides (%) | 5.4 | 4.1 | 2.2 | 21.4 |
|  | total sugar conc. (%) | 59.9 | 26.2 | 26.3 | 11.6 |
| Example 4 | fructose (%) | 41.9 | 3.4 | 83.0 | 0.59 |
|  | glucose (%) | 51.3 | 83.0 | 14.8 | 92.2 |
|  | other saccharides (%) | 6.8 | 13.6 | 2.2 | 7.2 |
|  | total sugar conc. (%) | 60.0 | 16.2 | 25.6 | 29.2 |

EXAMPLE 5

The apparatus shown in FIG. 3 was used to separate an aqueous mixed solution of fructose and glucose into an aqueous fructose solution and an aqueous glucose solution. There were used as an adsorbent a calcium salt-type strongly acidic cationic exchange resin (Diaion FRK-01) and as a desorbent water. Each unit packed bed is a cylinder having an inner diameter of 5.35 cm and a height of 380 cm in which 8.5 l of the adsorbent is packed. The apparatus is held at 60° C.

The operations at the respective stages are as follows:

First Stage: The aqueous sugar solution is fed from the reservoir (7) for the aqueous sugar solution to the unit packed bed (3) while withdrawing an aqueous glucose solution from the bed (3) into the reservoir (10) for the aqueous glucose solution.

Second Stage: The feed and withdrawal of the solutions are stopped and the solution in the apparatus is moved from the bed (1) through (2) and (3) to (4).

Third Stage: Water is fed from the water reservoir (8) to the bed (1) simultaneously with an aqueous fructose solution being withdrawn from the same bed into the reservoir (9) for the aqueous fructose solution.

Fourth Stage: Water is fed from the water reservoir (8) to the bed (1) while withdrawing an aqueous glucose solution from the bed (3) into the reservoir (11).

The operation times and operations of the valves at the respective stages are shown in Table 5 and the com-

TABLE 3

OPERATION OF VALVES

| | Operation stage | time (min) | Valve 12 | 13 | 14 | 15 | 16 | 17 | 18 | 19 | 22 | 23 | 24 |
|---|---|---|---|---|---|---|---|---|---|---|---|---|---|
| Example 2 | 1 | 19 | x | x | x | x | o | o | x | x | o | x | x |
|  | 2 | 76 | x | x | o | o | x | x | o | x | o | x | x |
|  | 3 | 26 | o | o | x | x | x | x | x | x | x | x | x |
|  | 4 | 13 | o | x | o | o | x | x | x | o | o | x | x |
| Example 3 | 1 | 19 | x | x | x | x | o | x | x | x | x | o | x |
|  | 2 | 75 | x | x | o | o | x | x | x | o | x | o | x |
|  | 3 | 26 | o | o | x | x | x | x | x | x | x | x | x |
|  | 4 | 13 | o | x | o | o | x | x | x | o | o | x | x |
| Example 4 | 1 | 19 | x | x | x | x | o | o | x | x | o | x | x |
|  | 2 | 76 | x | x | o | o | x | x | o | x | o | x | x |
|  | 3 | 26 | o | o | x | x | x | x | x | x | x | x | x |
|  | 4 | 13 | o | x | o | o | x | x | x | x | x | x | o | positions of the starting sugar solution and the withdrawn solutions under stationary state are shown in Table 6. The flow rate at the respective stages was held constant at 19.6 l/hr.

TABLE 5

| operation stage | time (min) | Operation of Valves — valves | | | | | | | | | | |
|---|---|---|---|---|---|---|---|---|---|---|---|
| | | 12 | 13 | 14 | 15 | 16 | 17 | 18 | 19 | 22 | 23 | 24 |
| 1 | 10 | x | x | x | x | o | x | x | x | x | o | x |
| 2 | 52 | x | x | o | o | x | x | o | x | o | x | x |
| 3 | 13 | o | o | x | x | x | x | x | x | x | x | x |
| 4 | 10 | o | x | o | o | x | x | x | x | x | x | o |

TABLE 6

Compositions of Starting Material and Products

| | starting aqueous sugar solution | solution discharged from first stage | solution discharged from third stage | solution discharged from fourth stage |
|---|---|---|---|---|
| fructose (%) | 45.5 | 18.6 | 82.8 | 2.7 |
| glucose (%) | 54.5 | 81.4 | 17.2 | 97.3 |
| total sugar conc. (%) | 55 | 23.8 | 22.8 | 10.6 |

EXAMPLES 6-7

The apparatus used in Example 5 was used to separate HFCS into fructose and glucose. The operation procedure is conducted for Example 6 in the same manner as in Example 5 and for Example 7 in the same manner as in Example 5 except that the third and fourth stages are reversed.

The operation times and operation of valves at the respective stages are shown in Table 7 and the compositions of the starting HFCS and of the aqueous fructose solution and the glucose solution under stationary state are shown in Table 8. The flow rate at the respective stages is held constant at 14.0 l/hr.

TABLE 7

| | operation stage | time (min) | Operation of Valves — valves | | | | | | | | | | |
|---|---|---|---|---|---|---|---|---|---|---|---|---|
| | | | 12 | 13 | 14 | 15 | 16 | 17 | 18 | 19 | 22 | 23 | 24 |
| Example 6 | 1 | 14 | x | x | x | x | o | x | x | x | o | x | x |
| | 2 | 72 | x | x | o | o | x | x | o | x | x | o | x |
| | 3 | 17 | o | o | x | x | x | x | x | x | x | x | x |
| | 4 | 11 | o | x | o | o | x | x | x | x | x | x | o |
| Example 7 | 1 | 14 | x | x | x | x | o | x | x | x | o | x | x |
| | 2 | 72 | x | x | o | o | x | x | o | x | x | o | x |
| | 3 | 11 | o | x | o | o | x | x | x | x | x | x | o |
| | 4 | 17 | o | o | x | x | x | x | x | x | x | x | x |

TABLE 8

| | starting HFCS | Example 6 | | Example 7 | |
|---|---|---|---|---|---|
| | | aqueous fructose solution | aqueous glucose solution | aqueous fructose solution | aqueous glucose solution |
| fructose (%) | 42.9 | 86.5 | 5.2 | 93.4 | 6.0 |
| glucose (%) | 49.3 | 4.7 | 87.7 | 3.5 | 82.8 |
| other saccharides (%) | 7.8 | 8.8 | 7.1 | 3.1 | 11.2 |
| total sugar conc. (%) | 60.0 | 26.2 | 21.8 | 22.5 | 23.9 |

Figure 5:
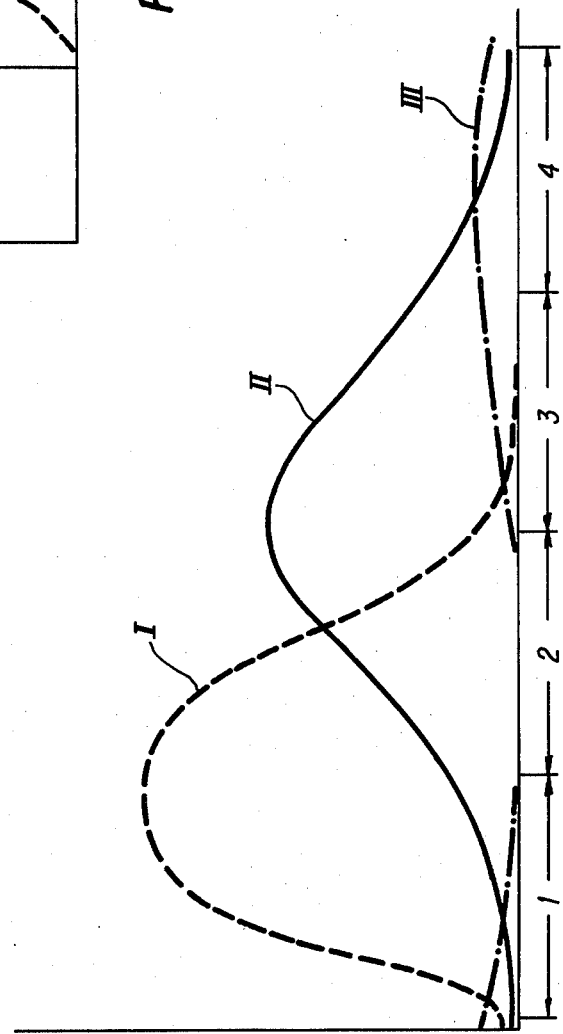
FIG. 5 is a schematical curve showing adsorption bands in the packed beds at the completion of the second stage in Examples 6 and 7, in which indicated at 1-4 are the respective unit packed beds and at I is an adsorption curve for fructose, at II is an adsorption curve for glucose and at III is an adsorption curve for the other saccharides.

It will be noted that the aqueous glucose solution of Example 6 is a combination of those withdrawn from the first and fourth stages while the aqueous glucose solution of Example 7 is a combination of those withdrawn from the first and third stages. The content of other saccharides in the aqueous frucose solution of Example 7 is less than that of Example 6. This is because, as shown in FIG. 5 schematically, other saccharides are present in the unit packed bed (1) at the completion of the second stage but, in Example 7, water is fed to the bed (1) to wash away the other saccharides and then the solution discharged from the bed (1) is collected as the aqueous fructose solution (the other saccharides are smaller in adsorptivity against the adsorbent than glucose).

Having now fully described this invention, it will be apparent to one of ordinary skill in the art that many changes and modifications can be made thereto without departing from the spirit or scope of the invention set forth herein.

We claim:

1. An adsorption separator consisting of first to third three packed sections wherein an adsorbent is packed and which are connected in series, the front end of the first packed section being communicated with the rear end of the third packed section through a fluid passage so that a fluid is able to be circulated through the respective packed sections, at least one pump mounted in the circulating system;

a first valve means located between said first and second packed sections, whereby fluid flow between said first and second packed sections can be controlled;

a second valve means located between said second and third sections, whereby fluid flow between said second and third packed sections can be controlled;

an inlet port for a starting fluid which is located between said second valve means and the front end of said third section, said inlet port being connected to a source of starting fluid through a third valve means whereby the flow of said starting fluid may be controlled;

a port for introducing a desorbent fluid into the separator which is located between the rear end of the third packed section and the front end of the first packed section, said port being connected to a source of desorbent fluid through a fourth valve means whereby the flow of said desorbent fluid may be controlled;

a first port for withdrawing a first fluid from the separator which is located between the rear end of the first packed section and said first valve means, said first port being connected to a first fluid receptacle through a fifth valve means whereby the flow of said first fluid may be controlled;

a second port for withdrawing a second fluid from the separator which is located between the rear end of the third packed section and the front end of the first packed section and upstream of the port for introducing a desorbent fluid and a sixth valve means is provided in the fluid passage between the said second port and said port for introducing a desorbent fluid to prevent the backward flow of fluid in said fluid passage, said second port being connected to a second fluid receptacle through a seventh valve means whereby the flow of said second fluid may be controlled.

2. An adsorption separator consisting of first to third three packed sections wherein an adsorbent is packed and which are connected in series, wherein the third packed section consists of first and second two sub-sections which are connected in series, the front end of the first packed being communicated with the rear end of the third packed section through a fluid passage so that a fluid is able to be circulated through the respective packed sections, at least one pump mounted in the circulating system;

a first valve means located between said first and second packed sections, whereby fluid flow between said first and second packed sections can be controlled;

a second valve means located between said second and third sections, whereby fluid flow between said second and third packed sections can be controlled;

an inlet port for a starting fluid which is located between said second valve means and the front end of said third section, said inlet port being connected to a source of starting fluid through a third valve means whereby the flow of said starting fluid may be controlled;

a port for introducing a desorbent fluid into the separator which is located between the rear end of the third packed section and the front end of the first packed section, said port being connected to a source of desorbent fluid through a fourth valve means whereby the flow of said desorbent fluid may be controlled;

a first port for withdrawing a first fluid from the separator which is located between the rear end of the first packed section and said first valve means, said first port being connected to a first fluid receptacle through a fifth valve means whereby the flow of said first fluid may be controlled;

a second port for withdrawing a second fluid from the separator which is located between the rear end of the third packed section and the front end of the first packed section and upstream of the port for introducing a desorbent fluid and a sixth valve means is provided in the fluid passage between the said second port and said port for introducing a desorbent fluid to prevent the backward flow of fluid in said fluid passage, said second port being connected to a second fluid receptacle through a seventh valve means whereby the flow of said second fluid may be controlled;

an eighth valve means located between said first and second sub-section, whereby fluid flow between said first and second sub-sections can be controlled;

a third port for withdrawing a third fluid from the separator which is located between the rear end of said first sub-section and said eighth valve means, said third port being connected to a third fluid receptacle through a ninth valve means whereby the flow of said third fluid may be controlled.

3. An adsorption separator consisting of first to third three packed sections wherein an adsorbent is packed and which are connected in series, wherein the third packed section consists of first and second two sub-sections which are connected in series, the front end of the first packed section being communicated with the rear end of the third packed section through a fluid passage so that a fluid is able to be circulated through the respective packed sections, at least one pump mounted in the circulating system;

a first valve means located between said first and second packed sections, whereby fluid flow between said first and second packed sections can be controlled;

a second valve means located between said second and third sections, whereby fluid flow between said second and third packed sections can be controlled;

an inlet port for a starting fluid which is located between said second valve means and the front end of said third section, said inlet port being connected to a source of starting fluid through a third valve means whereby the flow of said starting fluid may be controlled;

a port for introducing a desorbent fluid into the separator which is located between the rear end of the third packed section and the front end of the first packed section, said port being connected to a source of desorbent fluid through a fourth valve means whereby the flow of said desorbent fluid may be controlled;

a first port for withdrawing a first fluid from the separator which is located between the rear end of the first packed section and said first valve means, said first port being connected to a first fluid receptacle through a fifth valve means whereby the flow of said first fluid may be controlled;

a second and a third port for withdrawing a second and a third fluid, respectively, from the separator which are located between the rear end of the third packed section and the front end of the first packed section and upstream of the port for introducing a desorbent fluid and a sixth valve means is provided in the fluid passage between said second and third ports and said port for introducing a desorbent fluid to prevent the backward flow of fluid in said fluid passage, said second port being connected to a second fluid receptacle through a seventh valve means whereby the flow of said second fluid may be controlled, said third port being connected to a third fluid receptacle through an eighth valve means whereby the flow of said third fluid may be controlled;

a ninth valve means located between said first and second sub-sections, whereby fluid flow between said first and second sub-sections can be controlled;

a fourth and fifth port for withdrawing fluid from the separator which are located between the rear end of said first sub-section and said ninth valve means, said fourth port being connected to said second fluid receptacle through a tenth valve means whereby the flow of fluid to said second fluid receptacle may be controlled, said fifth port being connected to said third fluid receptacle through an eleventh valve means whereby the flow of fluid to said third fluid receptacle may be controlled.

4. An adsorption separator consisting of first to third three packed sections wherein an adsorbent is packed and which are connected in series, the front end of the first packed section being communicated with the rear end of the third packed section through a fluid passage so that a fluid is able to be circulated through the respective packed sections, at least one pumped mounted in the circulating system;

- a first valve means located between said first and second packed sections, whereby fluid flow between said first and second packed sections can be controlled;
- a second valve means located between said second and third sections, whereby fluid flow between said second and third packed sections can be controlled;
- an inlet port for a starting fluid which is located between said second valve means and the front end of said third section, said inlet port being connected to a source of starting fluid through a third valve means whereby the flow of said starting fluid may be controlled;
- a port for introducing a desorbent fluid into the separator which is located between the rear end of the third packed section and the front end of the first packed section, said port being connected to a source of desorbent fluid through a fourth valve means whereby the flow of said desorbent fluid may be controlled;
- a first port for withdrawing a first fluid from the separator which is located between the rear end of the first packed section and said first valve means, said first port being connected to a first fluid receptacle through a fifth valve means whereby the flow of said first fluid may be controlled;
- a second port for withdrawing a second fluid from the separator which is located between the rear end of the third packed section and the front end of the first packed section and upstream of the port for introducing a desorbent fluid and sixth valve means is provided in the fluid passage between the said second port and said port for introducing a desorbent fluid to prevent the backward flow of fluid in said fluid passage, said second port being connected to a second fluid receptacle through a seventh valve means whereby the flow of said second fluid may be controlled;
- a port for introducing a desorbent fluid into the separator which is located between said second valve means and the front end of said third section, said port being connected to said source of desorbent fluid through an eighth valve means whereby the flow of said desorbent fluid may be controlled.

5. An adsorption separator consisting of first to third three packed sections wherein an adsorbent is packed and which are connected in series, in front end of the first packed section being communicated with the rear end of the third packed section through a fluid passage so that a fluid is able to be circulated through the respective packed sections, at least one pump mounted in the circulating system;

- an inlet port for a starting fluid which is located between the rear end of said second packed section and the front end of said third section, said inlet port being connected to a source of starting fluid through a first valve means whereby the flow of said starting fluid may be controlled;
- a port for introducing a desorbent fluid into the separator which is located between the rear end of the third packed section and the front end of the first packed section, said port being connected to a source of desorbent fluid through a second valve means whereby the flow of said desorbent fluid may be controlled;
- a first port for withdrawing a first fluid from the separator which is located between the rear end of the first packed section and the front end of the second packed section, said first port being provided with a third valve means whereby the flow of said first fluid may be controlled;
- a second port for withdrawing a second fluid from the separator which is located between the rear end of the third packed section and the front end of the first packed section and upstream of the port for introducing a desorbent fluid and a fourth valve means is provided in the fluid passage between the said second port and said port for introducing a desorbent fluid to prevent the backward flow of fluid in said fluid passage, said second port being provided with a fifth valve means whereby the flow of said second fluid may be controlled.

6. An adsorption separator consisting of first to third three packed sections wherein an adsorbent is packed and which are connected in series, wherein the third packed section consists of first and second two sub-sections which are connected in series, the front end of the first packed section being communicated with the rear end of the third packed section through a fluid passage so that a fluid is able to be circulated through the respective packed sections, at least one pump mounted in the circulating system;

- an inlet port for a starting fluid which is located between the rear end of said second packed section and the front end of said third section, said inlet port being connected to a source of starting fluid through a first valve means whereby the flow of said starting fluid may be controlled;
- a port for introducing a desorbent fluid into the separator which is located between the rear end of the third packed section and the front end of the first packed section, said port being connected to a source of desorbent fluid through a second valve means whereby the flow of said desorbent fluid may be controlled;
- a first port for withdrawing a first fluid from the separator which is located between the rear end of the first packed section and the front end of the second packed section, said first port being provided with a third valve means whereby the flow of said first fluid may be controlled;
- a second port for withdrawing a second fluid from the separator which is located between the rear end of the third packed section and the front end of the first packed section and upstream of the port for introducing a desorbent fluid and a fourth valve means is provided in the fluid passage between the said second port and said port for introducing a desorbent fluid to prevent the backward flow of fluid in said fluid passage, said second port being provided with a fifth valve means whereby the flow of said second fluid may be controlled;
- a third port for withdrawing a third fluid from the separator which is located between the rear end of said first sub-section and the front end of said second sub-section, said third port being provided with a sixth valve means whereby the flow of said third fluid may be controlled.

7. An adsorption separator consisting of first to third three packed sections wherein an adsorbent is packed and which are connected in series, wherein the third packed section consists of first and second two sub-sections which are connected in series, the front end of the first packed section being communicated with the rear end of the third packed section through a fluid passage so that a fluid is able to be circulated through the respective packed sections, at least one pump mounted in the circulating system;

an inlet port for a starting fluid which is located between the rear end of said second packed section and the front end of said third section, said inlet port being connected to a source of starting fluid through a first valve means whereby the flow of said starting fluid may be controlled;

a port for introducing a desorbent fluid into the separator which is located between the rear end of the third packed section and the front end of the first packed section, said port being connected to a source of desorbent fluid through a second valves means whereby the flow of said desorbent fluid may be controlled;

a first port for withdrawing a first fluid from the separator which is located between the rear end of the first packed section and the front end of the second packed section, said first port being provided with a third valve means whereby the flow of said first fluid may be controlled;

a second and a third port for withdrawing a second and a third fluid, respectively, from the separator which are located between the rear end of the third packed section and the front end of the first packed section and upstream of the port for introducing a desorbent fluid and a fourth valve means is provided in the fluid passage between said second and third ports and said port for introducing a desorbent fluid to prevent the backward flow of fluid in said fluid passage, said second port being provided with a fifth valve means whereby the flow of said second fluid may be controlled, said third port being provided with a sixth valve means whereby the flow of said third fluid may be controlled;

a fourth and fifth port for withdrawing fluid from the separator which are located between the rear end of said first sub-section and the front end of said second sub-section, said fourth port being provided with a seventh valve means whereby the flow of said fourth fluid may be controlled, said fifth port being provided with an eighth valve means whereby the flow of said fourth fluid may be controlled.

8. An adsorption separator consisting of first to third three packed sections wherein an adsorbent is packed and which are connected in series, the front end of the first packed section being communicated with the rear end of the third packed section through a fluid passage so that a fluid is able to be circulated through the respective packed sections, at least one pump mounted in the circulating system;

an inlet port for a starting fluid which is located between the rear end of said second packed section and the front end of said third section, said inlet port being connected to a source of starting fluid through a first valve means whereby the flow of said starting fluid may be controlled;

a port for introducing a desorbent fluid into the separator which is located between the rear end of the third packed section and the front end of the first packed section, said port being connected to a source of desorbent fluid through a second valve means whereby the flow of said desorbent fluid may be controlled;

a first port for withdrawing a first fluid from the separator which is located between the rear end of the first packed section and the front end of the second packed section, said first port being provided with a third valve means whereby the flow of said first fluid may be controlled;

a second port for withdrawing a second fluid from the separator which is located between the rear end of the third packed section and the front end of the first packed section and upstream of the port for introducing a desorbent fluid and fourth valve means is provided in the fluid passage between the said second port and said port for introducing a desorbent fluid to prevent the backward flow of fluid in said fluid passage, said second port being provided with a fifth valve means whereby the flow of said second fluid may be controlled;

a port for introducing a desorbent fluid into the separator which is located between the rear end of said second section and the front end of said third section, said port being connected to said source of desorbent fluid through a sixth valve means whereby the flow of said desorbent fluid may be controlled.

* * * * *